United States Patent
Kilibarda (10) Patent No.: US 8,474,682 B2
(45) Date of Patent: Jul. 2, 2013

(54) SINGLE GEOMETRY PALLETIZED FRAMING SYSTEM

(75) Inventor: Velibor Kilibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 1249 days.

(21) Appl. No.: 12/257,922

(22) Filed: Oct. 24, 2008

(65) Prior Publication Data
US 2009/0289043 A1 Nov. 26, 2009

Related U.S. Application Data (60) Provisional application No. 61/054,969, filed on May 21, 2008.

(51) Int. Cl.
*B23K 37/04* (2006.01)

(52) U.S. Cl.
USPC ............... 228/47.1; 228/6.1; 29/430; 29/711; 198/339.1

(58) Field of Classification Search
USPC ........... 228/49.6, 6.1; 29/430, 711; 198/339.1
See application file for complete search history.

(56) References Cited

U.S. PATENT DOCUMENTS

| | | | |
|---|---|---|---|
| 4,667,866 A | 5/1987 | Tobita et al. | |
| 4,924,996 A | 5/1990 | Svensson et al. | |
| 4,937,929 A | 7/1990 | Nokajima et al. | |
| 5,347,700 A | 9/1994 | Tominaga et al. | |
| 5,400,943 A * | 3/1995 | Rossi | 228/6.1 |
| 6,008,471 A | 12/1999 | Alborante | |
| 6,173,881 B1 | 1/2001 | Sloan et al. | |
| 7,271,367 B2 | 9/2007 | Kilibarda et al. | |

FOREIGN PATENT DOCUMENTS

| | | |
|---|---|---|
| EP | 1837120 A1 | 9/2007 |
| RU | 2219034 C1 | 12/2003 |

OTHER PUBLICATIONS

Communication with extended European Search Report, modified Abstract and the European Search Opinion dated Sep. 4, 2009 from the corresponding European Patent Application No. 09159965.4-2302.

* cited by examiner

*Primary Examiner* — Nicholas P D'Aniello
(74) *Attorney, Agent, or Firm* — Young Basile (57) ABSTRACT

A palletized framing system for a motor vehicle body assembly system in which the pallet with a body structure positioned thereon is positioned at the framing station on balls to establish the vertical Z dimension with the pallet free to float on the balls in longitudinal X and lateral Y dimensions, whereafter positioners carried by one of the gates of the framing station engage and lock onto the pallet to precisely position the pallet and the body structure at the framing station at X and Y dimensions corresponding to the precisely attainable X and Y positioning of the gate.

20 Claims, 8 Drawing Sheets

SINGLE GEOMETRY PALLETIZED FRAMING SYSTEM

CROSS-REFERENCE TO RELATED APPLICATION

This application claims the benefit of U.S. provisional patent application Ser. No. 61/054,969 filed May 21, 2008.

BACKGROUND OF THE INVENTION

This invention relates to motor vehicle body welding systems and more particularly to a framing station in which loosely assembled body components are precisely located and welded.

Palletized framing systems in which the loosely assembled body components are moved to and from the framing station on a pallet are preferred to prior art systems in which the body components are moved from station to station by various other conveying devices.

However, the palletized system suffers from tolerance stack-ups resulting from variations in the dimensioning of the pallets and/or from wear in the positioning devices utilized to position the pallet in the framing station. Specifically, in the past, pallet positioning in the framing station has been accomplished by locators on the base of the framing station coacting to precisely position the pallet in the framing station. The accuracy of this positioning and therefore the accuracy of the welding operations performed on the body components at the framing station is dependent on precise dimensioning of the pallets. However, as a practical matter, pallet dimensions vary and tolerance stack-ups develop with the result that the welding operations are imprecise. Tolerance stack-ups and resultant imprecise welding also occurs as a result of wear in the positioning devices utilized to accurately position the pallet in the framing station.

SUMMARY OF THE INVENTION

This invention is directed to the provision of an improved apparatus for positioning pallets at a framing station.

More specifically, this invention is directed to a method and apparatus for positioning pallets at a framing station that eliminates tolerance stack-ups and resultant imprecise welding resulting from variations in pallet dimensions and/or wear in the pallet positioning devices.

The invention provides a method for use with a motor vehicle body weld station including a longitudinally extending bed and a pair of gates on opposite sides of the bed mounted for precision lateral movement relative to the bed to engage and weld body components forming a motor vehicle body assembly position in overlying relation to the bed.

The method precisely locates the body assembly at the weld station in a longitudinal (X), lateral (Y) and vertical (Z) dimension and comprises providing a pallet; positioning a body assembly on the pallet; moving the pallet with the body assembly positioned thereon longitudinally into the weld station in overlying relation to the bed; precisely positioning the pallet on the bed at a Z dimension while allowing the pallet to float in X and Y dimensions; and precisely moving one of the gates laterally relative to the bed to engage and lock onto the pallet to precisely position the pallet and the body assembly at the weld station in X and Y dimensions corresponding to the precise X and Y positioning of the one gate.

According to a further feature of the invention methodology, the pallet includes upstanding pillars supporting the body assembly and the step of precisely moving one of the gates laterally relative to the bed to engage and lock onto the pallet comprises moving the one gate laterally relative to the pallet to engage and lock onto one or more of the pillars.

According to a further feature of the invention methodology, the step of precisely positioning the pallet on the bed in a Z dimension while allowing the pallet to float in X and Y dimensions comprises providing a support surface on the bed lying in a plane corresponding to the desired Z dimension and placing the pallet on the support surface while allowing room for the pallet to float laterally and longitudinally relative to the bed.

According to a further feature of the invention methodology, the support surface is defined by a plurality of laterally and longitudinally spaced points on the bed lying in the plane and engaging spaced underfaces of the pallet.

According to a further feature of the invention methodology, each of the spaced points is defined by a ball having an upper periphery engaging a pallet underface.

According to a further feature of the invention methodology, each ball is mounted in a socket for rotational movement about the center of the ball to facilitate lateral and longitudinal movement of the pallet.

According to a further feature of the invention methodology, one of the gates includes longitudinally spaced positioners operative to engage and lock onto respective longitudinally spaced pillars in response to lateral movement of the gate relative to the bed.

According to a further feature of the invention methodology, each positioner includes a contact member operative to engage an outboard point on the circumference of the respective pillar and a clamp moveable between a retracted position and an operative position engaging an inboard point on the circumference of the respective pillar, whereby to clamp and lock the pillar between the contact member and the clamp.

According to a further feature of the invention methodology, one of the positioners includes a pad constituting the contact member and engaging an outboard point on the circumference of the respective pillar and an arm constituting the clamp and mounted for pivotal movement between the retracted position and an operative position in which the arm engages an inboard point on the circumference of the respective pillar generally diametrically opposed to the outboard point of engagement of the pad, whereby to precisely position the pallet in a Y dimension.

According to a further feature of the invention methodology, one of the positioners includes a saddle configured to straddle an outboard circumferential portion of the respective pillar and constituting the contact member and an arm constituting the clamp and mounted for pivotal movement between the retracted position and an operative position in which the arm engages an inboard point on the circumference of the respective pillar circumferentially spaced from the outboard circumferential portion of the pillar, whereby to precisely position the pallet in X and Y dimensions.

According to a further feature of the invention methodology, the saddle mounts a plurality of circumferentially spaced rollers engaging circumferentially spaced points on the outer circumferential portion of the pillar.

The invention further includes further unique apparatus for carrying out the methodology of the invention.

Other applications of the present invention will become apparent to those skilled in the art when the following description of the best mode contemplated for practicing the invention is read in conjunction with the accompanying drawings.

BRIEF SUMMARY OF THE DRAWINGS

The description herein makes reference to the accompanying drawings wherein like reference numerals refer to like parts throughout the several views and wherein.

DETAILED DESCRIPTION OF THE PREFERRED EMBODIMENT

Figure 1:
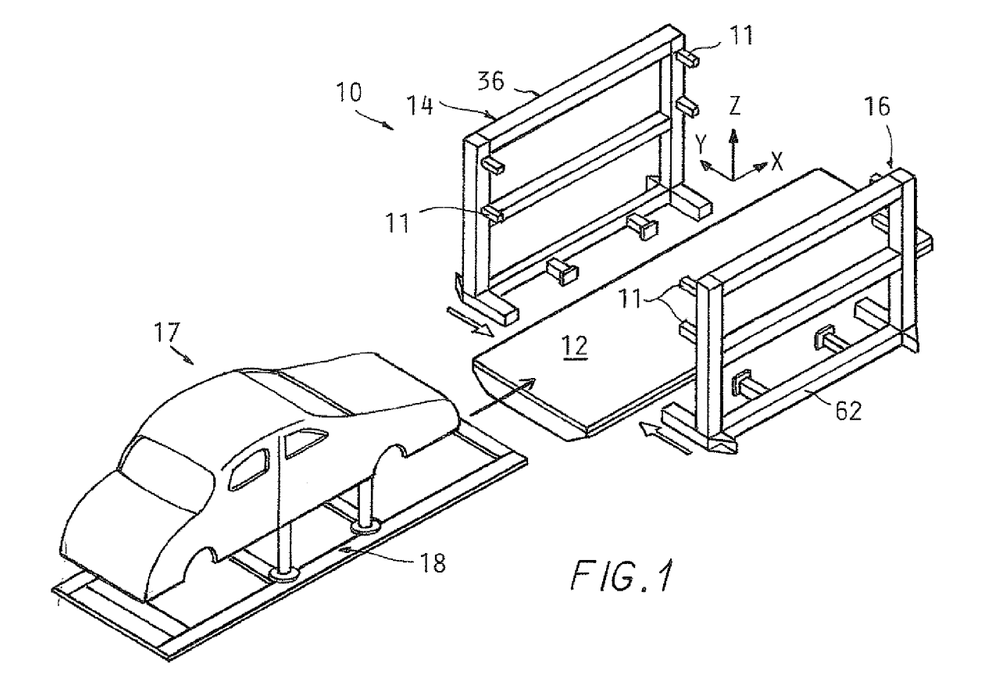
FIG. 1 is a schematic perspective view of a motor vehicle production line including a framing station.
Figure 2:
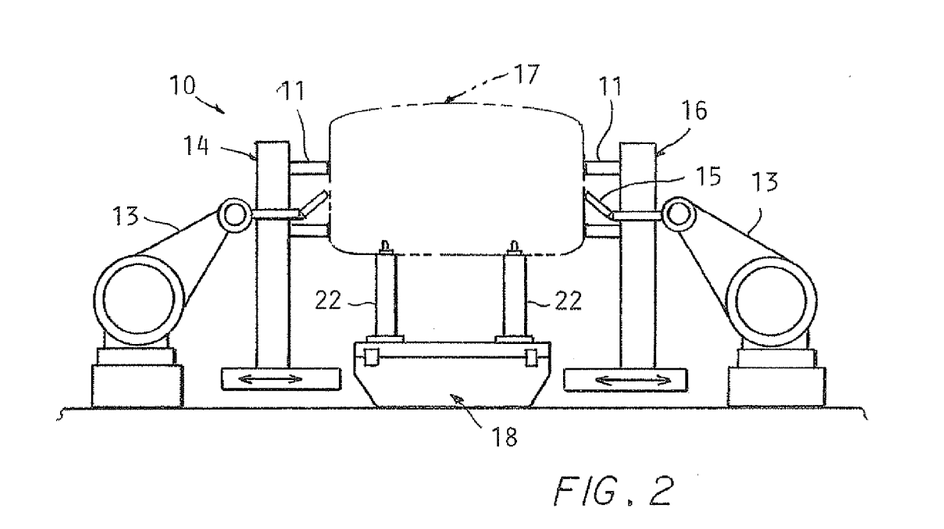
FIG. 2 is a schematic cross-sectional view of the schematic framing station of FIG. 1.
Figure 3:
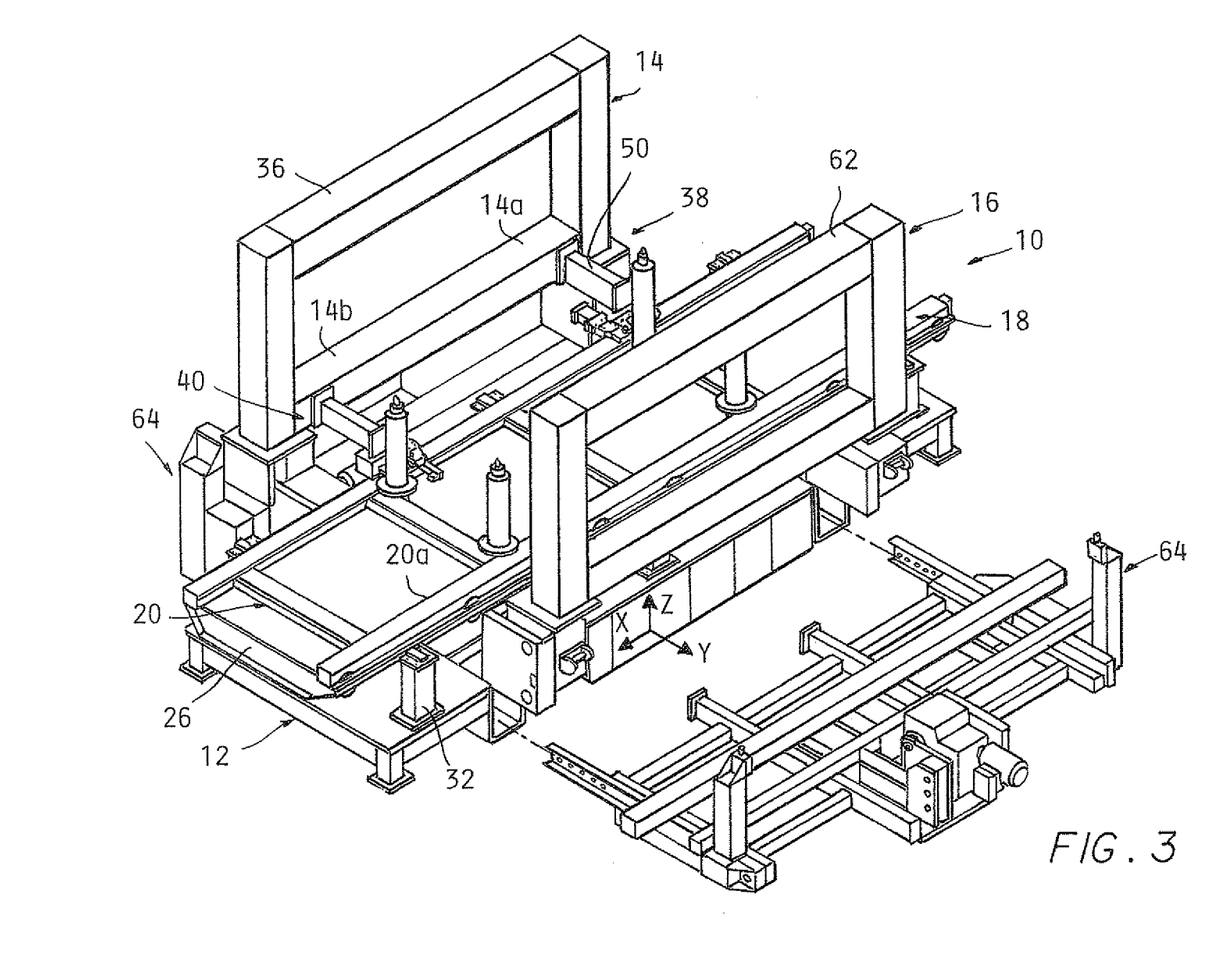
FIG. 3 is a perspective detail view of a framing station according to the invention.
Figure 4:
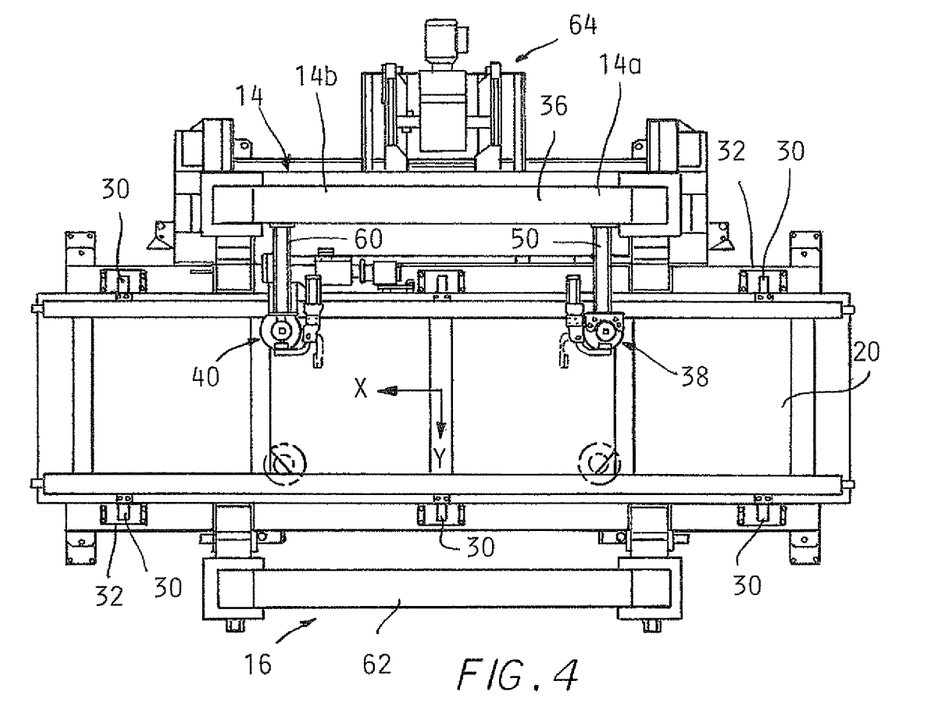
FIG. 4 is a plan view of the framing station of FIG. 3.
Figure 5:
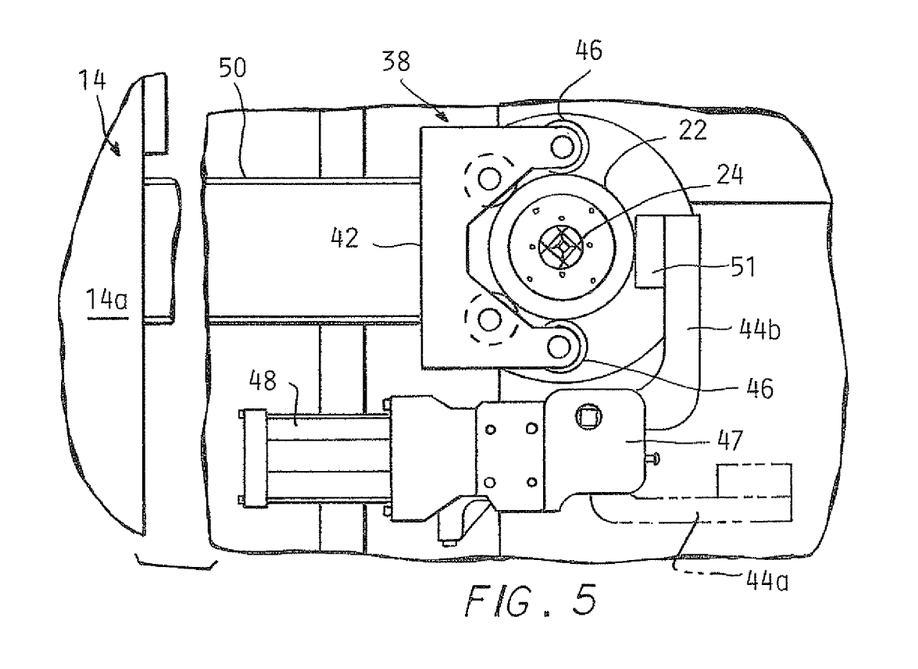
FIGS. 5, 6 and 7 are detail views of locators utilized in the framing station.
Figure 6:
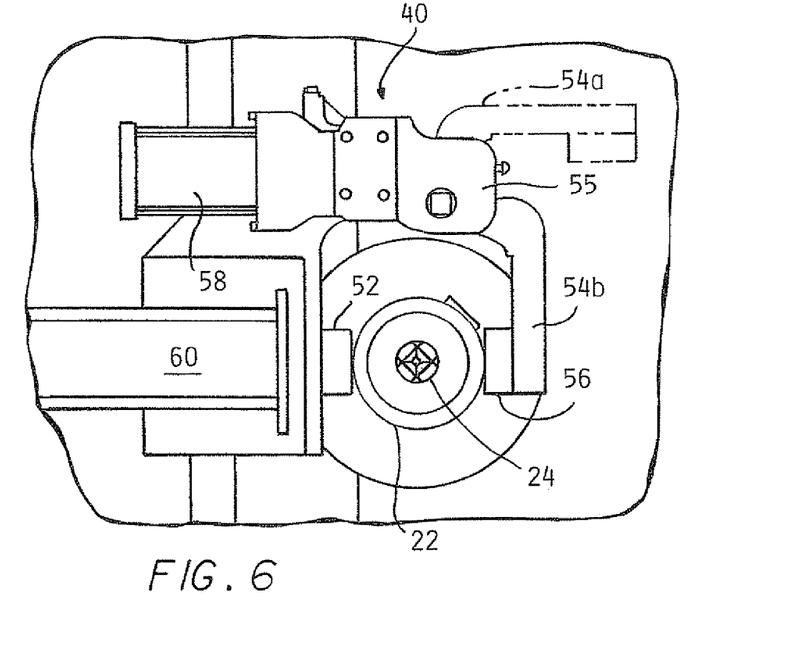
Figure 7:
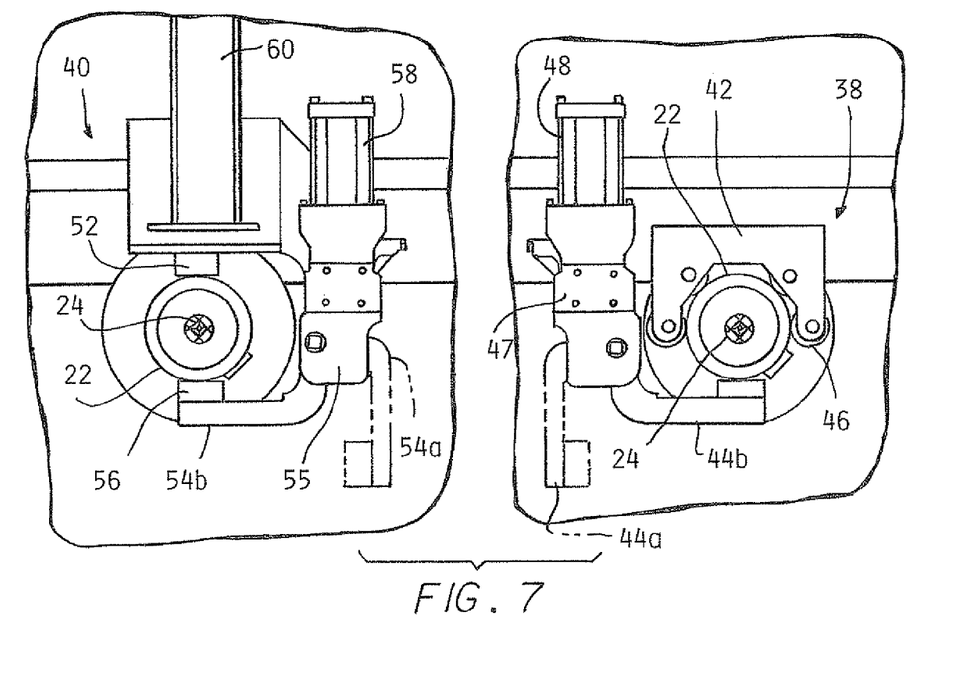

In the motor vehicle assembly system seen schematically in FIGS. 1 and 2, loosely assembled body components forming a motor vehicle body assembly 17 are positioned on a pallet structure 18 and transported via tracks, rollers or the like to a framing station 10 where the body structure is precisely positioned on a bed structure 12 of the station 10, left and right gates 14, 16 are moved laterally inwardly to bring tooling fixtures 11 carried by the gates into clamping engagement with the body assembly 17, and welding robots 13 carrying weld guns 15 are programmably utilized to perform welding operations on the loosely assembled components of the body assembly to form a welded rigid body assembly.

This invention concerns a method and apparatus for readily and effectively insuring that the body assembly 17 is precisely positioned at the station 10 in vertical (Z), horizontal (X), and lateral (Y) dimensions to insure that the weld operations are precisely performed.

The specific body assembly system of the invention, as best seen in FIGS. 3-14, includes a pallet structure 18 and a framing station 10 including a left gate structure 14, a right gate structure 16, and a bed structure 12 positioned therebetween.

Pallet structure 18 (FIGS. 8 and 9) includes a pallet top structure 20, pillars 22 extending upwardly from the pallet top structure at laterally and longitudinally spaced locations, locator pins 24 at the upper ends of the pillars, and a pallet foundation structure 26 underlying the top structure 20. It will be understood that the motor vehicle body structure 17, comprising a plurality of loosely assembled body components, is positioned on the pillars 22 with locator pins 24 received in suitable apertures in components of the body structure and that the pallet structure carrying a body structure is delivered to the framing station via rollers or other suitable conveyance devices. When positioned in the framing station, the pallet is positioned in the Z or vertical dimension by a plurality of balls 28 (FIGS. 8, 9, 13 and 14) carried by pads 30 mounted on top of pillars 32 of the bed structure 12. The balls lie in a common plane corresponding to the desired Z dimension of the pallet. For example, as shown, three pads 30 and three balls 28 may be positioned at longitudinally spaced locations along each side of the bed structure for a total of six ball support points for the pallet. Each ball engages the underside 34a of a pad 34 mounted at an appropriate outboard location along a longitudinal edge 20a of the pallet top structure 20 so that the balls establish the Z dimension of the pallet but the pallet is free to float in an XY plane. Each ball is mounted in a spherical socket 30a of the respective pad 30 for rotational movement about the center 28a of the ball to facilitate lateral and longitudinal floating or hunting movement of the pallet and the underface of each pad 34 provides a sufficient surface to allow sufficient hunting movement of the pallet on the balls in both X and Y dimensions.

Left hand gate 14 (FIGS. 3, 4, 8, 9 and 10) includes a main body open frame gate structure 36 mounted for lateral movement relative to the base structure, a four-way positioner 38 carried by a lower forward portion 14a of the gate structure, and a two-way positioner 40 carried by a lower rearward portion 14b of the gate structure.

Four-way positioner 38 (FIGS. 5, 7, and 12) includes a U-shaped saddle 42 and a clamp 44. Saddle 42 is sized to straddle a pillar 22 and includes circumferentially spaced rollers 46 positioned to engage circumferentially spaced points on an outboard circumferential portion of the pillar. Clamp 44 is pivotally mounted on a bracket 47 for movement between a retracted position seen at 44a in FIG. 5 and an operative position seen at 44b in FIG. 5 in which the clamp has been rotated via a power cylinder 48 carried by bracket 47 to a position in which a pad 51 carried by the free end of the clamp engages a further circumferentially spaced point on the pillar. It will be recognized that saddle 42 in coaction with clamp 44 serves to precisely position the pallet and the body structure 17 positioned thereon at the framing station in X and Y dimensions corresponding to the known and precisely attainable XY positioning of the gate. Four-way positioner 38, including bracket 47 and saddle 42, is suitably and rigidly mounted on the gate 14 utilizing, for example, an inwardly extending post 50.

Two-way positioner 40 (FIGS. 6, 7 and 11) includes a locator pad 52 for engaging an outboard circumferential point on a pillar 22 and a clamp 54 mounted on a bracket 55 for pivotal movement between a retracted position 54a and an operative position 54b in which a pad 56 carried by the clamp engages an inboard circumferential point on the pillar 22 diametrically opposed to the point of engagement of the pad 52 on the pillar 22. Clamp 54 is moved between its retracted and operative positions by a power cylinder 58 carried by bracket 55, and the two-way positioner, including pad 52 and bracket 55, is rigidly and fixedly secured to the gate 14 utilizing an inwardly extending post 60. It will be understood that the two-way positioner 40 serves to positively position the pallet and the body structure positioned thereon at the framing station in the Y dimension corresponding to the known and precisely attainable Y dimension of the gate.

Right hand gate 16 includes a main body gate structure 62 but is devoid of any positioners corresponding to the positioners 38/40 carried by the main body gate structure 36 of the left gate.

Figure 8:
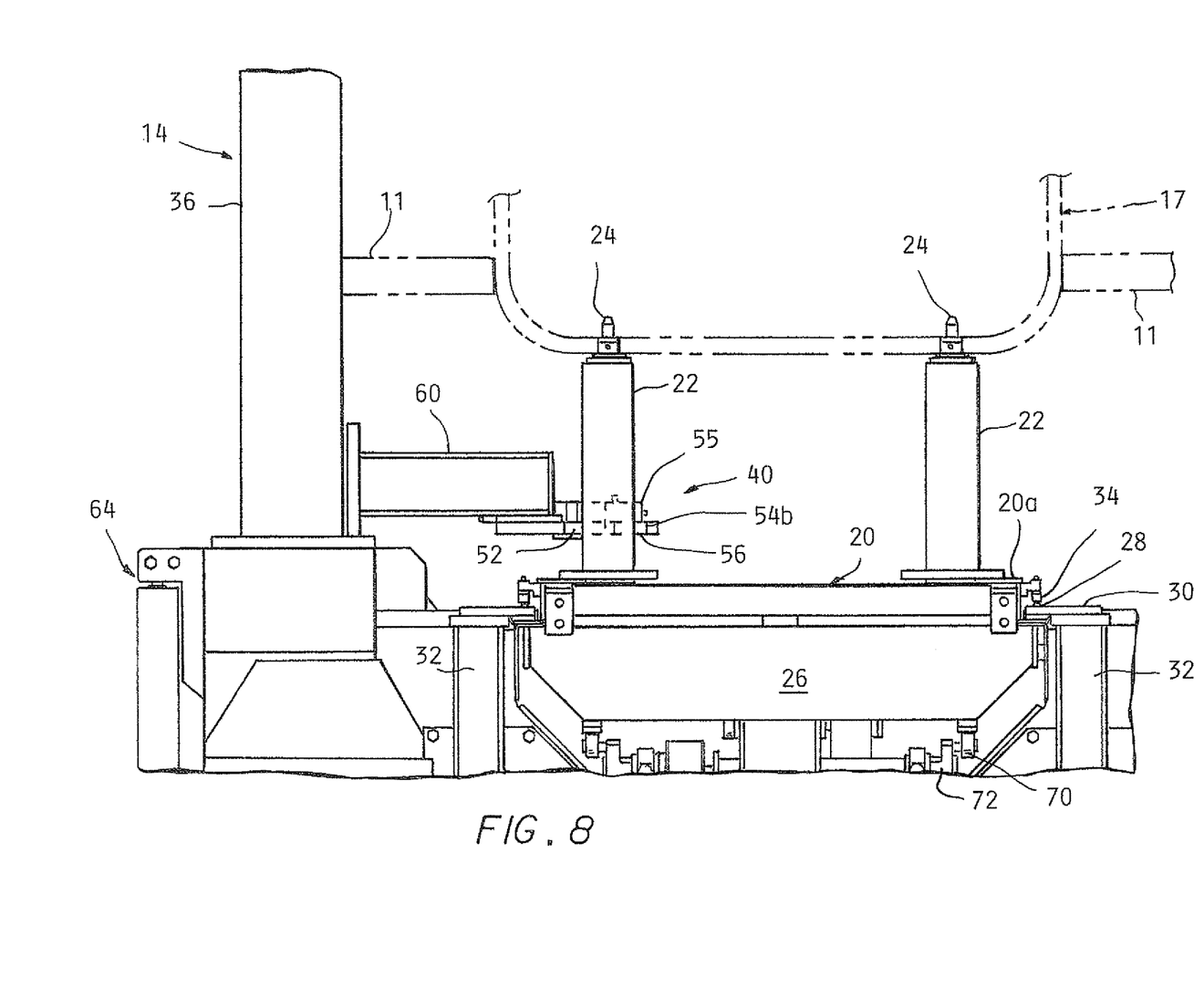
FIG. 8 is a fragmentary elevational view of the framing station.
Figure 9:
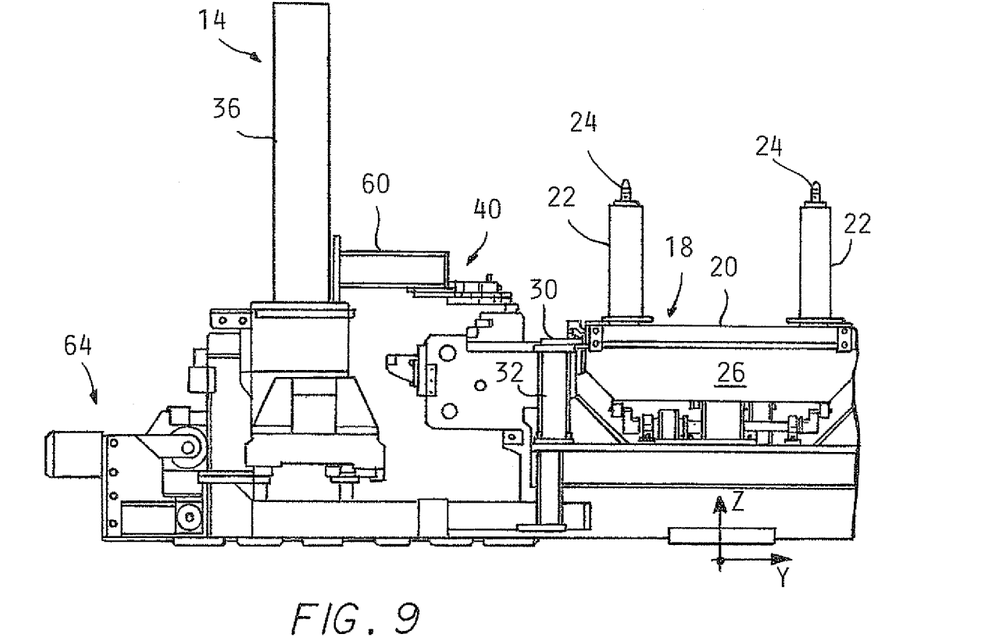
FIG. 9 is a fragmentary end elevational view of the framing station showing a left hand gate in a retracted position.
Figure 10:
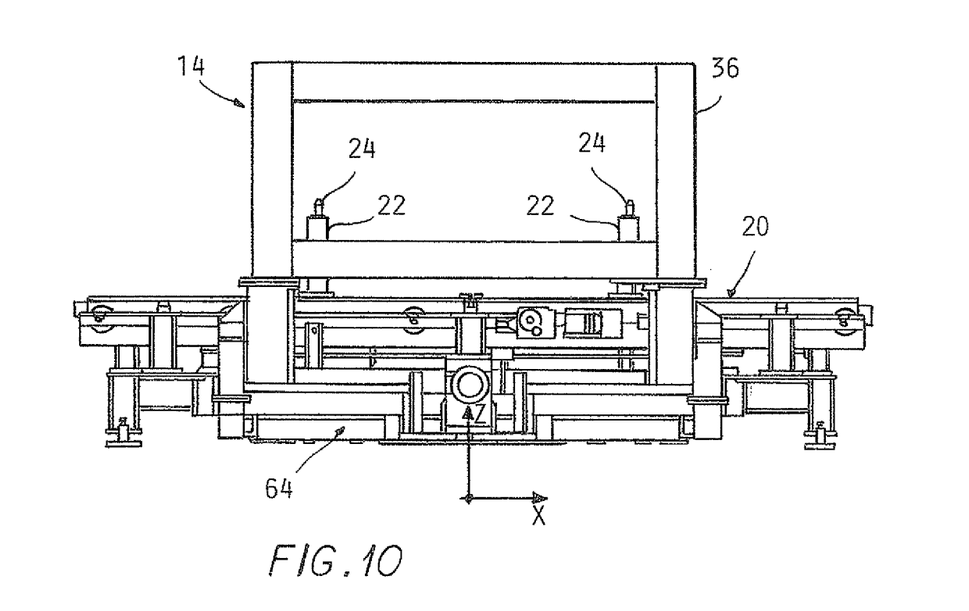
FIG. 10 a side elevational view of the framing station.
Figure 11:
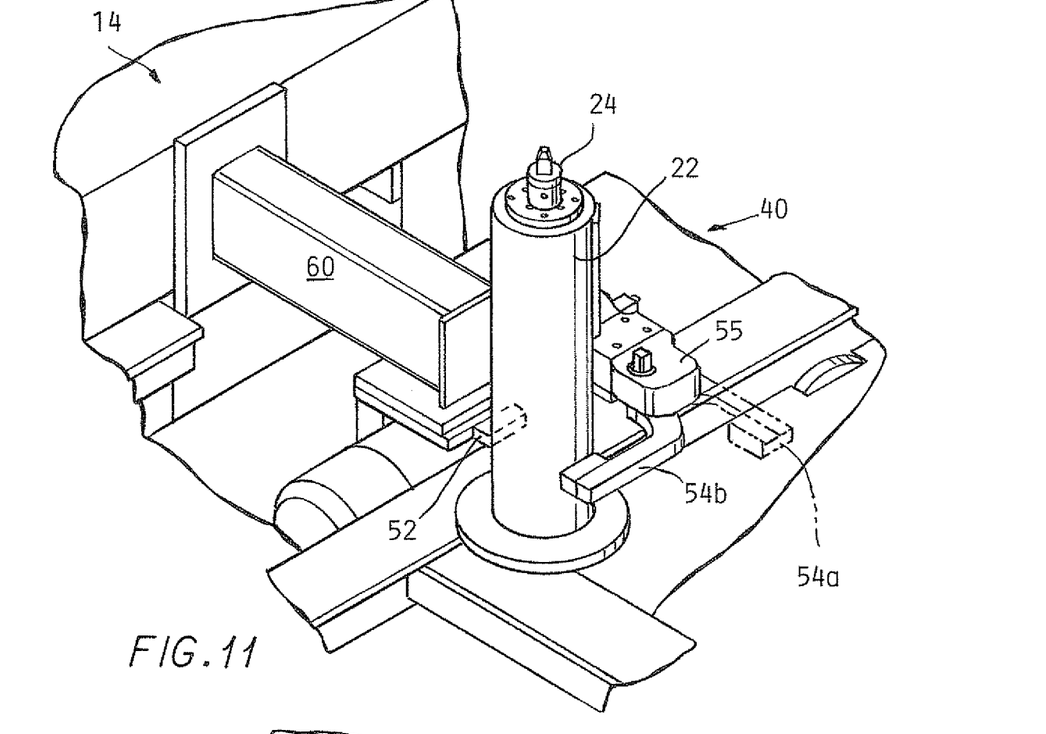
FIGS. 11, 12 and 13 are further detail views of the locators utilized at the framing station.
Figure 12:
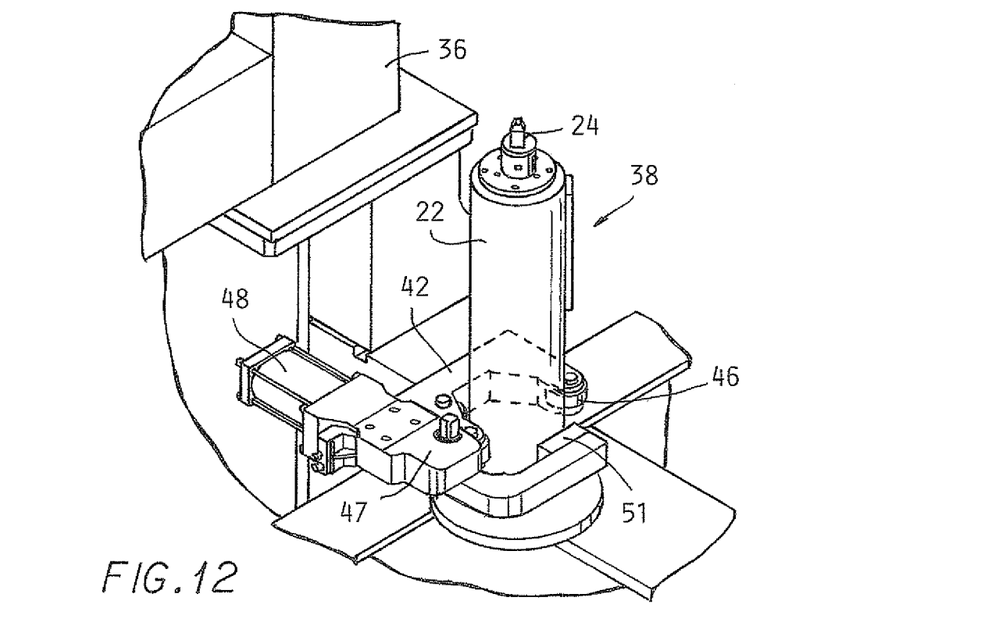
Figure 13:
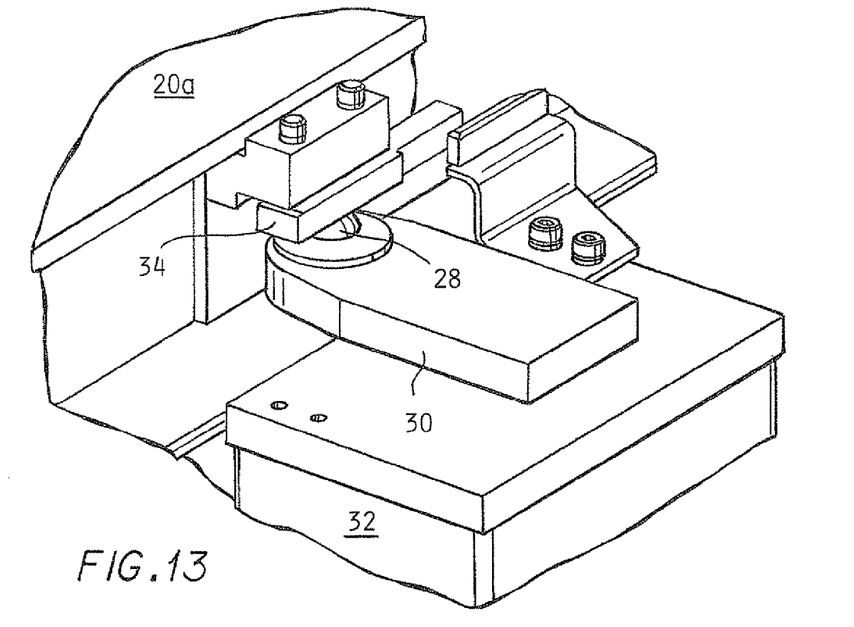
Figure 14:
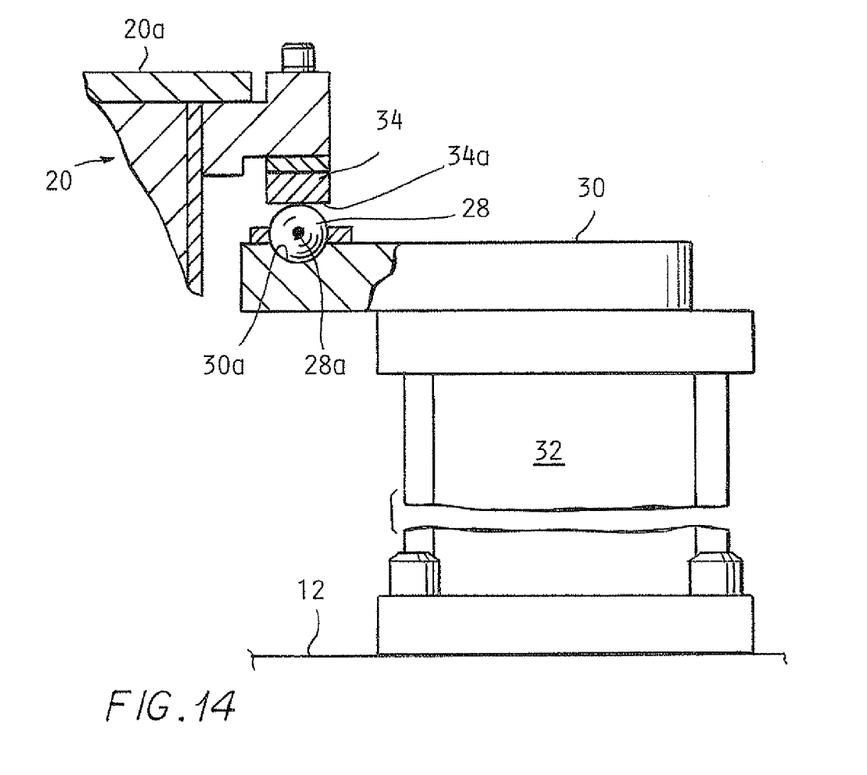
FIG. 14 is a fragmentary elevational view of the framing station.

Each gate, in addition to the main body gate structure 36/62, includes a power and slide structure 64 (FIGS. 3, 4, 8, 9, and 10) to facilitate lateral movement of the gate between its retracted and operative or advanced positions. The retracted position of gate 14 is seen in FIG. 9 and the advanced or operative position of gate 14 is seen in FIG. 8. Gates of this general type are shown, for example, in U.S. Pat. No. 6,173,881 assigned to the assignee of the present invention.

Various conveyance devices may be utilized to position the pallet structure 20 on the Z plane formed by the balls 28. For example, and as shown schematically in FIG. 8, the pallet with a body structure 17 positioned thereon may be positioned on the bed structure 12 of the framing station on rollers 70 with pads 34 spaced slightly above balls 28 whereafter an eccentric device 72 may be utilized to lower the rollers 70 and allow the pads 34 to seat on the balls to establish the Z support plane for the pallet.

With a body structure 17 positioned in the framing station on a pallet 20, rollers 28 engage pads 34 to establish the Z or vertical dimensional positioning of the pallet in the framing station with the pallet free to float in an XY direction on the balls, and positioners 38, 40 engage the pillars 22 to establish the XY dimensional positioning of the pallet within the framing station. It will be understood, as explained with respect to schematic FIGS. 1 and 2 that gates 14, 16 carry suitable clamps and/or end effector tooling 11 to suitably engage the loosely assembled body structure 17 to facilitate the welding operation. As the gates are moved from their outboard retracted positions to their operative positions, the positioners 38, 40 engage the pillars 22 as the gates reach their operative positions. Specifically, once the saddles 42 and pads 52 have engaged the outboard points of the respective pillars and the clamps 44, 54 have been moved to their operative position engaging the inboard points on the respective pillars, the pallet has been moved to a precise XY position relative to the bed structure with the necessary movement of the pallet in the XY plane allowed by the floating disposition of the pallet on the balls 28. It will be understood that, of the three directional concerns, the Z level or direction is the easiest to control so that the present invention, by precisely controlling the more difficult to manage X and Y dimensions, greatly improves the overall dimensional accuracy of the system. The invention, in effect, transfers the precisely controllable and precisely attainable X and Y positioning of the gates to the X and Y positioning of the pallets.

The invention arrangement eliminates the prior art problem relative to tolerance stack-up in the system because of variations in pallet dimensions or because of wear in the pallet positioning devices since the pallet is effectively eliminated from the XY positioning operation to effect a zero tolerance framer. Specifically, the left framing gate and associated body locators (four-way and two-way) have the net effect of effectively eliminating tolerance stack-ups by effectively removing the influence of dimensional variations in the pallet or wear in the pallet positioning devices.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A motor vehicle body weld station including a longitudinally extending bed and a pair of gates on opposite sides of the bed mounted for precision lateral movement relative to the bed to engage and weld body components forming a motor vehicle body assembly positioned in overlying relation to the bed on a pallet positioned on the bed, characterized in that:
   the bed defines a support surface having a plurality of laterally and longitudinally spaced points on the bed lying in a common plane adapted to engage spaced underfaces of the pallet for precisely positioning the pallet in a vertical (Z) dimension while allowing the pallet to float in longitudinal (X) and lateral (Y) dimensions along the common plane; and
   one of the gates includes longitudinally spaced positioners operative in response to precision lateral movement of the gate relative to the bed to engage and lock onto the pallet to precisely position the pallet and the body assembly at the weld station in X and Y dimensions corresponding to the precise X and Y positioning of the one gate.

2. A weld station according to claim 1 wherein:
   the body assembly is positioned on pillars upstanding from the pallet; and
   the longitudinally spaced positioners selectively engage and lock onto the respective pillars of the pallet.

3. A weld station according to claim 1 wherein each of the plurality of laterally and longitudinally spaced points is defined by a ball having an upper periphery adapted to engage the respective pallet underface.

4. A weld station according to claim 3 wherein each ball is mounted in a socket for rotational movement about the center of the ball to facilitate lateral and longitudinal movement of the pallet.

5. A weld station according to claim 2 wherein each positioner includes a contact member for selected engagement with an outboard point on a circumference of the respective pillar and a clamp having a a retracted position and an operative position for selected engagement with an inboard point on the circumference of the respective pillar to selectively clamp and lock the pillar between the contact member and the clamp.

6. A weld station according to claim 5 wherein one of the positioners includes a pad constituting the contact member and adapted to engage an outboard point on the circumference of the respective pillar and an arm constituting the clamp and mounted for pivotal movement between the retracted position and an operative position in which the arm may engage an inboard point on the circumference of the respective pillar generally diametrically opposed to the outboard point of engagement of the pad, whereby to position the pallet in a Y dimension.

7. A weld station according to claim 5 wherein one of the positioners includes a saddle configured to straddle an outboard portion of the circumference of the respective pillar and constituting the contact member and an arm constituting the clamp and mounted for pivotal movement between the retracted position and an operative position in which the arm engages an inboard point on the circumference of the respective pillar circumferentially spaced from the outboard circumferential portion of the pillar, whereby to position the pallet in X and Y dimensions.

8. A weld station according to claim 7 wherein the saddle mounts a plurality of circumferentially spaced rollers engaging circumferentially spaced points on the outer circumferential portion of the pillar.

9. A weld station according to claim 5 wherein:
   one of the positioners includes a pad constituting the contact member and adapted to engage an outboard point on the circumference of the respective pillar and an arm constituting the clamp and mounted for pivotal movement between the retracted position and an operative position in which the arm may engage an inboard point on the circumference of the respective pillar generally diametrically opposed to the outboard point of engagement of the pad, whereby to position the pallet in a Y dimension; and
   one of the positioners includes a saddle configured to straddle an outboard circumferential portion of the respective pillar and constituting the contact member and an arm constituting the clamp and mounted for pivotal movement between the retracted position and an operative position in which the arm engages an inboard point on the circumference of the respective pillar circumferentially spaced from the outboard circumferential portion of the pillar, whereby to position the pallet in X and Y dimensions.

10. A motor vehicle body weld station comprising:
a longitudinally extending bed;
a pallet adapted to be positioned on the bed;
a pair of gates on opposite sides of the bed mounted for lateral movement relative to the bed to engage and position vehicle body components positioned on the pallet;
wherein the bed defines a support surface having a plurality of laterally and longitudinally spaced points on the bed lying in a common plane adapted to engage spaced underfaces of the pallet for precisely positioning the pallet in a vertical (Z) dimension while allowing the pallet to float in longitudinal (X) and lateral (Y) dimensions along the common plane; and
one of the gates includes longitudinally spaced positioners operative in response to precision lateral movement of the gate relative to the bed to engage and lock onto the pallet to precisely position the pallet and the body assembly at the weld station in X and Y dimensions corresponding to the precise X and Y positioning of the one gate.

11. A motor vehicle body weld station assembly according to claim 10 wherein:
the pallet includes a plurality of spaced upstanding pillars supporting the body assembly; and
the longitudinally spaced positioners selectively engage and lock onto respective pillars of the pallet.

12. A weld station according to claim 10 wherein each of the plurality of laterally and longitudinally spaced points is defined by a ball having an upper periphery adapted to engage the respective pallet underface.

13. A body weld station assembly according to claim 12 wherein each ball is mounted in a socket for rotational movement about the center of the ball to facilitate lateral and longitudinal movement of the pallet.

14. A body weld station assembly according to claim 11 wherein:
the pallet further includes a locator pin positioned on the top of each pillar; and
the body assembly defines locator holes receiving the locator pins to locate the body assembly on the pallet.

15. A weld station assembly according to claim 11 wherein each positioner includes a contact member selectively engaging an outboard point on a circumference of the respective pillar and a clamp having a retracted position and an operative position for selective engagement with an inboard point on the circumference of the respective pillar to selectively clamp and lock the pillar between the contact member and the clamp.

16. A weld station assembly according to claim 15 wherein one of the positioners includes a pad constituting the contact member and engaging an outboard point on the circumference of the respective pillar and an arm constituting the clamp and mounted for pivotal movement between the retracted position and an operative position in which the arm engages an inboard point on the circumference of the respective pillar generally diametrically opposed to the outboard point of engagement of the pad, whereby to position the pallet in a Y dimension.

17. A weld station assembly according to claim 15 wherein one of the positioners includes a saddle configured to straddle an outboard portion of the circumference of the respective pillar and constituting the contact member and an arm constituting the clamp and mounted for pivotal movement between the retracted position and an operative position in which the arm engages an inboard point on the circumference of the respective pillar circumferentially spaced from the outboard circumferential portion of the pillar, whereby to position the pallet in X and Y dimensions.

18. A weld station assembly according to claim 17 wherein the saddle mounts a plurality of circumferentially spaced rollers engaging circumferentially spaced points on the outer circumferential portion of the pillar.

19. A weld station assembly according to claim 15 wherein:
one of the positioners includes a pad constituting the contact member and engaging an outboard point on the circumference of the respective pillar and an arm constituting the clamp and mounted for pivotal movement between the retracted position and an operative position in which the arm engages an inboard point on the circumference of the respective pillar generally diametrically opposed to the outboard point of engagement of the pad, whereby to position the pallet in a Y dimension; and
one of the positioners includes a saddle configured to straddle an outboard circumferential portion of the respective pillar and constituting the contact member and an arm constituting the clamp and mounted for pivotal movement between the retracted position and an operative position in which the arm engages an inboard point on the circumference of the respective pillar circumferentially spaced from the outboard circumferential portion of the pillar, whereby to position the pallet in X and Y dimensions.

20. A motor vehicle body weld station assembly including a longitudinally extending bed, a pallet adapted to be positioned on the bed and including spaced, upstanding pillars, and a pair of gates on opposite sides of the bed mounted for precision lateral movement relative to the bed to engage and weld body components forming a motor vehicle body assembly positioned on the pillars in overlying relation to the bed, characterized in that:
the bed defines a plurality of laterally and longitudinally spaced balls lying in a common plane and engaging spaced underfaces of the pallet and operative to precisely position the pallet in a vertical (Z) dimension while allowing the pallet to float in longitudinal (X) and lateral (Y) dimensions; and
one of the gates includes longitudinally spaced positioners, each positioner including a contact member for selected engagement with an outboard point on a circumference of the respective pillar and a clamp having a retracted position and an operative position for selected engagement with an inboard point on the circumference of the pillar to selectively lock onto respective pillars to precisely position the pallet and the body assembly at the weld station in dimensions corresponding to the precise positioning of the one gate.

* * * * *